United States Patent
Chiu et al.

[11] Patent Number: 6,106,714
[45] Date of Patent: Aug. 22, 2000

[54] FILTERING APPARATUS WITH STIRRER IN A CMP APPARATUS

[75] Inventors: Hao-Kuang Chiu, Hsinchu; Peng-Yih Peng, Hsinchu Hsien, both of Taiwan

[73] Assignee: United Microelectronics Corp., Hsin-Chu, Taiwan

[21] Appl. No.: 09/111,036

[22] Filed: Jul. 7, 1998

[30] Foreign Application Priority Data

Apr. 24, 1998 [TW] Taiwan .................................. 87206320

[51] Int. Cl.[7] .................................................. B01D 35/00
[52] U.S. Cl. ...................... 210/321.63; 451/446; 451/60; 210/415; 366/274
[58] Field of Search ..................... 210/332, 319, 210/348, 295, 298, 321.63, 415; 366/273, 274; 451/60; 438/692, 693

[56] References Cited

U.S. PATENT DOCUMENTS

| | | |
|---|---|---|
| 4,145,293 | 3/1979 | Cook . |
| 4,328,096 | 5/1982 | Chupka et al. . |
| 4,368,112 | 1/1983 | Thompson et al. . |
| 4,547,289 | 10/1985 | Okano et al. . |
| 4,689,152 | 8/1987 | Liang . |
| 4,849,263 | 7/1989 | Pepe et al. . |
| 5,044,314 | 9/1991 | McNeilly . |
| 5,047,126 | 9/1991 | Greenberg . |
| 5,296,139 | 3/1994 | Hanson et al. . |
| 5,755,614 | 5/1998 | Adams et al. . |
| 5,791,970 | 8/1998 | Yueh . |
| 5,799,643 | 9/1998 | Miyata et al. . |
| 5,855,792 | 1/1999 | Adams et al. . |
| 5,895,315 | 4/1999 | Pinder, Jr. . |
| 6,015,499 | 1/2000 | Hayden . |

*Primary Examiner*—W. L. Walker
*Assistant Examiner*—Terry K. Cecil
*Attorney, Agent, or Firm*—J. C. Patents; Jiawei Huang

[57] ABSTRACT

A chemical-mechanical polishing (CMP) apparatus includes a filtering apparatus for filtering slurry. The filtering apparatus includes an input aperture located at the top of the filter housing and connected to a slurry supplying machine. An output aperture located at the side of the filter housing is connected to a polishing pad. The filtering apparatus also includes a filter attached to the top of the filter housing and a stirring objected located below the filter. A stirrer is located below the filter housing for driving the stirring object without a mechanical contact. The stirring object is preferably bar-shaped and enclosed with PTFE.

6 Claims, 1 Drawing Sheet

FILTERING APPARATUS WITH STIRRER IN A CMP APPARATUS

CROSS-REFERENCE TO RELATED APPLICATION

This application claims the priority benefit of Taiwan application serial no. 87206320, filed Apr. 24, 1998, the full disclosure of which is incorporated herein by reference.

BACKGROUND OF THE INVENTION

1. Field of the Invention

This invention relates to a filtering apparatus for the purpose of filtering slurry, and more particularly to a filtering apparatus that includes a stirring apparatus and an output aperture on the top of a filter housing.

2. Description of Related Art

As the integration of semiconductor devices increases, the size of the metal oxide semiconductor (MOS) transistor is reduced accordingly. This, in turn, increases the requirements of interconnects. Therefore, a design including at least two metal layers is gradually becoming necessary for most integrated circuits. In this kind of design, in order to more easily fabricate devices and transfer circuit patterns more precisely, it is important to planarize the wafer, which is usually not even due to the many structured layers formed on it. Furthermore, planarizing the wafer is the main factor affecting the precision of the alignment. A poor planarization causes imprecise alignment of a mask to the wafer and also induces a higher rate of error in fabrication.

So far, chemical-mechanical polishing (CMP) is the only process capable of globally planarizing a very large scale integration (VLSI) structure or even for an ultra large semiconductor integration (ULSI) structure. CMP uses a machine similar to a knife grinder along with a chemical reagent to mechanically grind the uneven profile of the wafer so that it is planarized.

The reagent is usually referred to as a slurry in CMP. Slurry usually includes a solution mixed with silica in colloidal phase or materials in dispersed phase such as aluminum, KOH or $NH_4OH$. The grinding particles are extremely hard and have a diameter of about 0.1–0.2 μm. Basically, these particles are used to polish the wafer surface. Moreover, before slurry is transported to the polishing pad to polish the wafer, slurry has to be filtered by a filtering apparatus to protect the wafer from being scratched by impurities in the slurry or even from being seriously damaged, which would result in fabrication failure.

FIG. 1 is a cross sectional view schematically illustrating a conventional filtering apparatus. Referring to FIG. 1, the filtering apparatus is mounted on a CYBEQ IP8000 CMP machine.

A filter 12 is assembled inside a filter housing 10 for the purpose of filtering slurry, which is supplied to the filter housing 10 by a slurry supplying machine 14 through a duct 16 connected to an input aperture 17. The filter 12 includes an aperture 19 on a bottom 18, which allows filtered slurry to flow to a polishing pad 22 through a duct 20.

When the polishing pad is not in use, the slurry is not supplied and is at an idle status. Because slurry is not flowing, slurry is deposited on the bottom 18 of the filter housing 10 and becomes a crystalline deposit 24 and blocks the filter 12. Besides of this blockage problem, slurry is continuously supplied during performance of CMP. Furthermore, because slurry flows out of the filter housing 10 from the bottom 18 through the aperture 19, slurry is poorly filtered, which increases the possibility of scratching the wafer.

Following is a summary of conventional filtering apparatus drawbacks:

1. When slurry is not supplied and is at an idle status, slurry is deposited on the bottom 18 of the filter housing 10 in a crystalline deposit 24 and blocks the filter 12.
2. During CMP fabricating performance, slurry flows out of the filter housing 10 from the bottom 18 through the aperture 19, in which process the slurry is poorly filtered. This increases the possibility of scratching the wafer.

SUMMARY OF THE INVENTION

It is therefore an objective of the invention to provide a filtering apparatus which uses a stirring apparatus. This apparatus includes a stirring object located inside a filter housing and a stirrer to drive the stirring object. This prevents formation of a slurry deposit on the bottom of the filter housing.

It is another an objective of the invention to provide a filtering apparatus, in which slurry is transported out from the top of the filter housing in order to improve filtering and to avoid damaging the wafer by, for example, scratching it.

In accordance with the foregoing and other objectives of the present invention, the filtering apparatus includes a stirring apparatus. This stirring apparatus further includes a stirring object inside the filter housing and a stirrer to continuously drive the stirring object by which filter blockage due to slurry deposit on the bottom of the filter housing is prevented. The driving force for the stirring object is preferably a magnetic force so that the stirring object and the stirrer are coupled without a mechanical contact.

In the foregoing, the filtering apparatus includes an output aperture on the top of the filter housing so that filtering is improved and damages to the wafer, such as scratches made by slurry particles, are avoided.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

Figure 1:
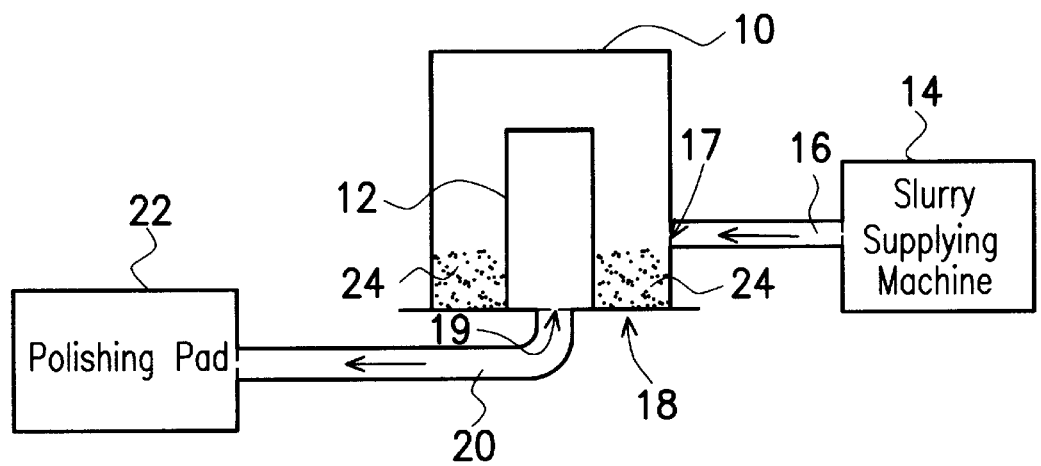
FIG. 1 is a cross sectional view schematically illustrating a conventional filtering apparatus.
Figure 2:
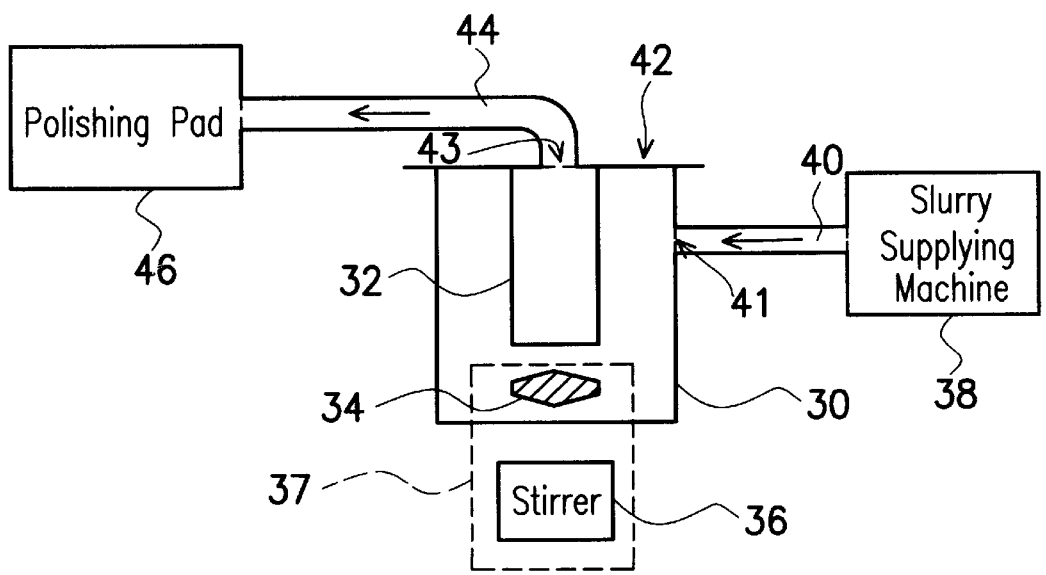
FIG. 2 is a cross sectional view schematically illustrating a filtering apparatus, according to the preferred embodiment of the invention.

FIG. 2 is a cross-sectional view that schematically illustrates a filtering apparatus, according to the preferred embodiment of the invention. Referring to FIG. 2, a CMP machine such as a CYBEQ IP8000 CMP machine is shown. A filter 32 is located inside a filter housing 30 for the purpose of filtering slurry. Both the filter 32 and the filter housing 30 are made of polytetrafluoroethylene (PTFE). Polytetrafluoroethylene is commercially available under the trademark TEFLON, which has a strong resistance to both acidity and alkalinity. A slurry supplying machine 38 supplies slurry into the filter housing 30 through a duct 40 attached to an input aperture 41. Slurry is filtered by the filter 32 and flows to a polishing pad 46 through an output aperture 43, which is located on the top 42 of the filter housing 30, through a duct 44.

While CMP is performed, slurry used to polish the wafer is continuously transported from the supply machine of slurry 38 to the polishing pad 46 as described above. A stirring object 34, for the purpose of stirring the slurry, is further included inside the filter housing. A stirrer 36 is located below the bottom of the filter housing 30 to drive the stirring object 34. The stirring object 34 and the stirrer 36 are grouped as a stirring apparatus 37 and are easy to be obtained at a low cost. The function of the stirring apparatus 37 is to stir the slurry so that slurry is not deposited on the bottom of the filter housing 30. Any stirring apparatus 37, which can achieve this stirring function, is suitable. One preferred embodiment of the invention is to use a magnetic force as the driving force on the stirring object 34 from the stirrer 36 so that they are coupled without direct mechanical contact. The stirring object 34, for example, can be a magnetized bar-like object, which is enclosed in PTFE and is driven by the stirrer 36 through the magnetic force exerted by the stirrer 36 on the magnetized stirring object 34. The stirrer 36 behaves like a blender blade and continuously spins the stirring object 34, whether or not CMP is being performed. Therefore, no slurry is deposited because the slurry is continuously stirred.

The invention has yet another advantage because slurry flows from the top 42 of the filter housing to the polishing pad 46. This improves filtering and damages of wafer, such as scratches on the wafer, are effectively avoided.

In conclusion, the invention is characterized by following:

1. The filtering apparatus includes a stirring apparatus, which further includes a stirring object inside the filter housing and a stirrer to continuously drive the stirring object to avoid blocking the filter.
2. The filtering apparatus includes an output aperture on the top of the filter housing so that the filtering effect is improved and damages to the wafer, such as scratches made by slurry particles, are avoided.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A chemical-mechanical polishing (CMP) apparatus comprising in combination the following:
    (a) a slurry supplying machine fluidly connected to a filtering apparatus;
    (b) said filtering apparatus for filtering said slurry comprising
        (i) a filter housing having an input aperture located on a side of the filter housing and an output aperture located on a top of said filter housing,
        (ii) a filter fixed inside said filter housing and connected to a top of said housing, wherein the output aperture is located directly above the filter, and
        (iii) a stirring object located below said filter and inside said housing and a stirrer located below said filter housing for driving the stirring object without a mechanical contact; and
    (c) a polishing pad, said polishing pad fluidly connected to said output aperture.

2. The filtering apparatus of claim 1, wherein a driving force from the stirrer comprises a magnetic force for driving the stirring object.

3. The filtering apparatus of claim 2, wherein the stirring object comprises a magnetized object, which is enclosed by polytetrafluoroethylene.

4. The filtering apparatus of claim 3, wherein the magnetized object has a bar shape.

5. The filtering apparatus of claim 1, wherein the filter housing comprises polytetrafluoroethylene.

6. The filtering apparatus of claim 1, wherein the filter comprises polytetrafluoroethylene.

* * * * *